(12) United States Patent
Hodgson et al.

(10) Patent No.: US 9,593,615 B2
(45) Date of Patent: Mar. 14, 2017

(54) DEVICE HAVING AN ELECTRICALLY HEATABLE HONEYCOMB BODY AND METHOD FOR OPERATING THE HONEYCOMB BODY

(71) Applicant: EMITEC GESELLSCHAFT FUER EMISSIONSTECHNOLOGIE MBH, Lohmar (DE)

(72) Inventors: Jan Hodgson, Troisdorf (DE); Christian Vorsmann, Cologne (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 0 days.

(21) Appl. No.: 14/107,085

(22) Filed: Dec. 16, 2013

(65) Prior Publication Data

US 2014/0112850 A1   Apr. 24, 2014

Related U.S. Application Data

(63) Continuation of application No. PCT/EP2012/061391, filed on Jun. 15, 2012.

(30) Foreign Application Priority Data

Jun. 15, 2011   (DE) .................. 10 2011 104 193

(51) Int. Cl.
*B01D 39/00*   (2006.01)
*B01D 41/00*   (2006.01)
(Continued)

(52) U.S. Cl.
CPC ........... *F01N 3/2889* (2013.01); *B01D 53/92* (2013.01); *F01N 3/2026* (2013.01); *F01N 9/00* (2013.01);
(Continued)

(58) Field of Classification Search
CPC ....... Y02T 10/26; Y02T 19/47; F01N 3/2026; F01N 3/2013; F01N 9/00; F01N 3/281
See application file for complete search history.

(56) References Cited

U.S. PATENT DOCUMENTS 4,102,127 A   7/1978 Saiki et al.
4,272,668 A   6/1981 Johnson et al.
(Continued)

FOREIGN PATENT DOCUMENTS

DE   2719252 A1   8/1978
DE   102008035561 A1   2/2010
(Continued)

OTHER PUBLICATIONS

International Search Report of PCT/EP2012/061391, Dated October 12, 2012.

*Primary Examiner* — Amber R Orlando
(74) *Attorney, Agent, or Firm* — Laurence A. Greenberg; Werner H. Stemer; Ralph E. Locher

(57) ABSTRACT

A device for exhaust gas treatment in an exhaust system of an internal combustion engine, in particular in a motor vehicle, includes an electrically heatable honeycomb body through which an exhaust gas can flow. The honeycomb body is disposed in a casing tube and has at least one current-conducting structure with electric insulation for voltages greater than 24 V. A current-generating pulsed voltage is applied to the structure to heat the honeycomb body. It is thus possible for heating elements in the exhaust-gas flow to be powered by an on-board electrical system voltage of for example 48 V. A method for operating the honeycomb body is provided with which, even at operating voltages greater than 24 V, the generation of heat in the electrically heatable honeycomb body can be kept in a (Continued)

desired range by adjustment of a pulse width and/or repetition frequency of the pulsed voltage.

13 Claims, 4 Drawing Sheets

(51) Int. Cl.
| | |
|---|---|
| *B01D 45/00* | (2006.01) |
| *B01D 46/00* | (2006.01) |
| *B01D 49/00* | (2006.01) |
| *B01D 50/00* | (2006.01) |
| *B01D 51/00* | (2006.01) |
| *F01N 3/28* | (2006.01) |
| *F01N 9/00* | (2006.01) |
| *F01N 3/20* | (2006.01) |
| *B01D 53/92* | (2006.01) |

(52) U.S. Cl.
CPC ....... *F01N 2900/1404* (2013.01); *Y02T 10/26* (2013.01); *Y02T 10/47* (2013.01)

(56) References Cited

U.S. PATENT DOCUMENTS

| | | | | |
|---|---|---|---|---|
| 4,473,732 | A * | 9/1984 | Payne | H05B 6/062 219/625 |
| 4,562,695 | A * | 1/1986 | Rao | F01N 3/027 60/286 |
| 5,072,712 | A | 12/1991 | Steinbrenner et al. | |
| 5,140,812 | A | 8/1992 | Cornelison et al. | |
| 5,146,743 | A | 9/1992 | Maus et al. | |
| 5,146,744 | A | 9/1992 | Whittenberger | |
| 5,321,231 | A | 6/1994 | Schmalzriedt et al. | |
| 5,322,672 | A | 6/1994 | Breuer et al. | |
| 5,388,404 | A | 2/1995 | Tsumura | |
| 5,480,621 | A | 1/1996 | Breuer et al. | |
| 5,525,309 | A * | 6/1996 | Breuer et al. | 422/174 |
| 5,643,484 | A * | 7/1997 | Swars et al. | 219/552 |
| 5,865,864 | A * | 2/1999 | Bruck | 55/482 |
| 7,510,600 | B2 * | 3/2009 | Ibe | B01D 46/2418 60/275 |
| 7,727,488 | B2 * | 6/2010 | Miyairi | B01D 53/56 204/164 |
| 8,012,440 | B2 | 9/2011 | Hodgson et al. | |
| 2001/0043890 | A1 * | 11/2001 | Son | B01D 53/94 422/174 |
| 2003/0233824 | A1 * | 12/2003 | Chun | B01D 53/9431 60/275 |
| 2005/0229564 | A1 * | 10/2005 | Okubo | B01D 53/32 55/523 |
| 2005/0268596 | A1 | 12/2005 | Abe | |
| 2006/0156919 | A1 * | 7/2006 | Sellers | F01N 3/023 95/8 |
| 2009/0071128 | A1 * | 3/2009 | Gonze | F01N 3/027 60/286 |
| 2009/0071129 | A1 * | 3/2009 | Gonze | F01N 3/027 60/286 |
| 2010/0108657 | A1 * | 5/2010 | Konieczny et al. | 219/202 |
| 2010/0139247 | A1 * | 6/2010 | Hiemstra | F01N 3/027 60/277 |
| 2011/0000194 | A1 | 1/2011 | Gonze et al. | |
| 2011/0265551 | A1 * | 11/2011 | Hopka | F01N 3/021 73/23.31 |
| 2012/0097659 | A1 | 4/2012 | Duesterdiek et al. | |

FOREIGN PATENT DOCUMENTS

| | | |
|---|---|---|
| DE | 102009018182 A1 | 10/2010 |
| EP | 0503445 A1 | 9/1992 |
| EP | 0541190 A1 | 5/1993 |
| JP | 03181337 | 8/1991 |
| JP | H04166606 A | 6/1992 |
| JP | H05212293 A | 8/1993 |
| JP | 2005240583 A | 9/2005 |
| WO | 8910471 A1 | 11/1989 |
| WO | 8910472 A1 | 11/1989 |

* cited by examiner

DEVICE HAVING AN ELECTRICALLY HEATABLE HONEYCOMB BODY AND METHOD FOR OPERATING THE HONEYCOMB BODY

CROSS-REFERENCE TO RELATED APPLICATION

This is a continuation, under 35 U.S.C. §120, of copending International Application No. PCT/EP2012/061391, filed Jun. 15, 2012, which designated the United States; this application also claims the priority, under 35 U.S.C. §119, of German Patent Application DE 10 2011 104 193.5, filed Jun. 15, 2011; the prior applications are herewith incorporated by reference in their entirety.

BACKGROUND OF THE INVENTION

Field of the Invention

The present invention relates to a device for catalytically converting, or otherwise treating, exhaust gases in an exhaust system, in particular in an exhaust gas purification system of a motor vehicle. The device has a honeycomb body which is disposed in a casing tube, can be heated electrically, and through which an exhaust gas can flow. The invention also relates to a method for operating such an electrically heatable honeycomb body. For this purpose, the honeycomb body has a current-conducting structure to which a current-generating voltage can be applied.

In order to influence the temperature of exhaust gases of an internal combustion engine and, under certain circumstances, influence the temperature of an exhaust gas purification component, it is known to influence the exhaust gas and/or the exhaust gas purification component with a heating device. Efforts are made in that context to increase the temperature of the exhaust gas or of the exhaust gas purification component above a critical temperature, with the result that a catalytic reaction of the pollutants in the exhaust gas with a catalytic coating of the exhaust gas purification components can take place. That is desirable, in particular, in the case of cold starting processes or restarting processes of the internal combustion engine. Certain temperature ranges also have to be complied with during other processes in an exhaust gas purification system in order to achieve good purification. That relates, in particular, to the regeneration of particle filters and adsorbers.

Honeycomb bodies with current-conducting structures, which heat the exhaust gas and/or an exhaust gas purification component through Ohmic resistance heating when a voltage is applied, have already been proposed as heating devices. Such honeycomb bodies are described, for example, in International Publication No. WO 89/10471, corresponding to U.S. Pat. Nos. 5,146,743, 5,322,672 and 5,480,621 and International Publication No. WO 89/10472, corresponding to U.S. Pat. No. 5,072,712. In those documents, the current-conducting structures are formed by metal foils which are, under certain circumstances, structured and wound. However, due to the low specific resistance of the metal foils it is difficult to manufacture current-conducting structures which do not take up excessively high power given an operating voltage of 24 V [volts] or higher, which is generally a direct voltage, and then melt or destroy the power supply. The resistance of the current-conducting structure is therefore increased, for example, by meandering formation of the metal foils, but for that purpose electrically insulating gaps or insulating layers have to be formed between the foils.

In order to continue to obtain a certain heating power in the current-conducting structure when the on-board electrical system voltage of a motor vehicle, that is to say the voltage with which the loads of the motor vehicle are supplied, is increased, the resistance of the current-conducting structure would have to be increased, which can generally be achieved by finer division by using gaps and/or electrical insulating layers. However, increasing the on-board electrical system voltage of a motor vehicle to, for example, 48 V makes the risk of failure of the insulation greater, for example due to arcing or similar mechanisms.

BRIEF SUMMARY OF THE INVENTION

It is accordingly an object of the invention to provide a device having an electrically heatable honeycomb body and a method for operating the honeycomb body, which overcome the hereinafore-mentioned disadvantages and at least partially solve the highlighted problems of the heretofore-known devices and methods of this general type and which, in particular, treat and especially catalytically convert, exhaust gases and permit the exhaust gas of an internal combustion engine and/or an exhaust gas purification component to be heated with a supply voltage of over 24 V.

With the foregoing and other objects in view there is provided, in accordance with the invention, a device for treating, in particular catalytically converting, exhaust gases in an exhaust system, comprising a first honeycomb body which is disposed in a casing tube and through which an exhaust gas can flow, the honeycomb body having at least one current-conducting structure, bounded by gaps and/or insulating layers, which bring about insulation even under operating conditions for voltages higher than 24 V, in particular higher than 48 V.

The device is preferably disposed in an exhaust gas after-treatment system of an internal combustion engine of a motor vehicle, in particular of a spark ignition engine or a diesel engine, with the casing tube preferably forming the exhaust gas line of the exhaust gas after-treatment system. The honeycomb body preferably has a multiplicity of channels which extend in the direction of flow of the exhaust gas. The channel walls can be embodied with flow-influencing structures, with a porosity and/or with openings. Quite particularly preferably the honeycomb body through which there can be a flow is manufactured from a multiplicity of metallic foils which are embodied in an at least partially structured and/or corrugated fashion. The metallic foils can be stacked and/or wound or wrapped one in the other and form the channel walls. It is quite particularly preferred that the layers are formed from alternating structured and smooth foils.

In particular, at least one of these metallic foils is, as a current-conducting structure, embodied with insulation from adjacent metallic foils and has electrical contacts for connecting a voltage source outside the casing tube. In order to obtain a sufficient high electrical resistance in the current-conducting structure, the current-conducting structure preferably has a current path which is as long as possible, such as is achieved, for example, by a meandering shape. However, this results in relatively fine insulating structures. According to the invention, these are of such a size or are provided with such an insulating material that no electrical flashovers can occur when a voltage is applied of more than 24 V, in particular up to more than 48 V or even 60 V. This is achieved, in particular, by a gap size of at least 1 mm [millimeter].

In principle, many of the known configurations of electrically heatable honeycomb bodies, in particular also honeycomb bodies which are extruded from electrically conductive material, can be changed in such a way that the insulation corresponds to the increased requirements. In this context, in particular the dimensions and materials of the insulation have to be matched. However, it also has to be ensured that the insulation remains durable and functionally capable during operational loading. In exhaust systems, honeycomb bodies are subjected to strong alternating thermal loads with corresponding expansion, and deposits can bring about short-circuits. Insulation has to be configured for such loads.

In accordance with another preferred feature of the invention, the device has a control unit configured to generate a pulsed voltage and to apply that voltage to the current-conducting structure. Such a control unit makes it possible to feed the electrical power discontinuously to the current-conducting structure with the result that the energy supplied by the pulses can be adjusted by using the pulse width and/or the pulse repetition frequency. When such a control unit is used, current-conducting structures can also be operated with an on-board electrical system voltage of, for example, 48 V, although the current-conducting structures have not been originally configured for such high voltages. Given sufficiently short pulses and a suitably low repetition frequency, there is no risk of melting. Even arcing which possibly occurs when there is damage to the insulation is repeatedly quenched by the pulsed application of the voltage.

In accordance with a further advantageous feature of the device of the invention, the current-conducting structure has an electrical resistance between 0.001Ω [Ohms] and 10Ω, preferably between 0.03Ω and 0.8Ω, quite particularly preferably between 0.05Ω and 0.3Ω. In order to feed a power of 1000 W [watts] to a current-conducting structure at a constant voltage of 48 V, the current-conducting structure would have to have a resistance of approximately 2.3Ω. Correspondingly, for a constantly fed-in power of 500 W or 2000 W, the current-conducting structure would have to have a resistance of 4.6Ω or of 1.2Ω. According to the present invention, it is, however, sufficient, for example given a resistance of the current-conducting structure of 0.5Ω, if a pulsed voltage with a voltage level of 48 V is present when a voltage is applied for only somewhat more than a fifth (⅕) of the time compared to the voltage which is not switched on, in order to feed in a power of approximately 1000 W when averaged over time. This is achieved, for example, with a pulsed rectangular-wave voltage with a pulse length of 0.11 s [seconds] and a pulse interval of 0.5 s, that is to say a repetition rate of 2 Hz [Hertz].

With the objects of the invention in view, there is also provided a method for operating an electrically heatable honeycomb body through which an exhaust gas can flow. The method comprises providing at least one current-conducting structure, and applying a current-generating pulsed voltage which is higher than 24 V to the current-conducting structure in order to heat the honeycomb body.

A pulsed voltage is understood to be a voltage which rises periodically between a zero voltage and a maximum voltage value and drops again. A pulsed voltage is preferably a rectangular-wave voltage or a sawtooth voltage. Due to the pulsed application of the electrical power to the current-conducting structure, energy is only discontinuously fed to the current-conducting structure with the result that the input of power can be kept in a desired range given a high maximum voltage even in current-conducting structures with a low resistance.

In accordance with another mode of the invention, the pulsed voltage is preferably applied with a repetition rate of 0.1 Hz [Hertz] to 1000 Hz, particularly preferably of 1 Hz to 100 Hz. The term repetition rate refers to the reciprocal value of the time between one increase in the voltage and the next increase in the voltage of the next pulse. The energy which is introduced into the current-conducting structure can therefore occur with a constant pulse length by using frequency modulation.

In accordance with a further mode of the invention, when a rectangular-wave voltage is applied it is preferred that each pulse has a pulse length of 0.001 s [second] to 1 s, particularly preferably of 0.005 s to 0.5 s. This makes it possible for the energy introduced into the current-conducting structure to be adapted by pulse width modulation.

In accordance with an added mode of the invention, the pulsed voltage quite particularly preferably has a voltage level of approximately 48 V. This means that the maximum pulsed voltage has a value between 46 V to 50 V, in particular approximately 48 V, after the periodic increase.

In accordance with a concomitant advantageous mode of the method of the invention, the pulse length and/or the repetition rate are adjusted as a function of exhaust gas parameters, in particular as a function of the temperature of the exhaust gas. In this way, in particular the electrical energy which is required to raise the exhaust gas and/or the honeycomb body to a necessary temperature can be fed to the current-conducting structure. It is therefore possible for efficient heating to take place. In this context, control loops can be formed with the pulse width and/or the repetition rate as a manipulated variable or manipulated variables.

The details and advantages disclosed for the method according to the invention can be transferred to the device according to the invention and applied, and vice versa. The invention and the technical field are explained by way of example below with reference to the figures. It is to be noted that the figures present particularly preferred embodiment variants of the invention, but the invention is not restricted thereto.

Other features which are considered as characteristic for the invention are set forth in the appended claims, noting that the features disclosed individually in the claims can be combined with one another in any desired technically appropriate way and can be supplemented with explanatory contents from the description, in which further embodiment variants of the invention are indicated.

Although the invention is illustrated and described herein as embodied in a device having an electrically heatable honeycomb body and a method for operating the honeycomb body, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE SEVERAL
VIEWS OF THE DRAWING

DETAILED DESCRIPTION OF THE INVENTION

Figure 1:
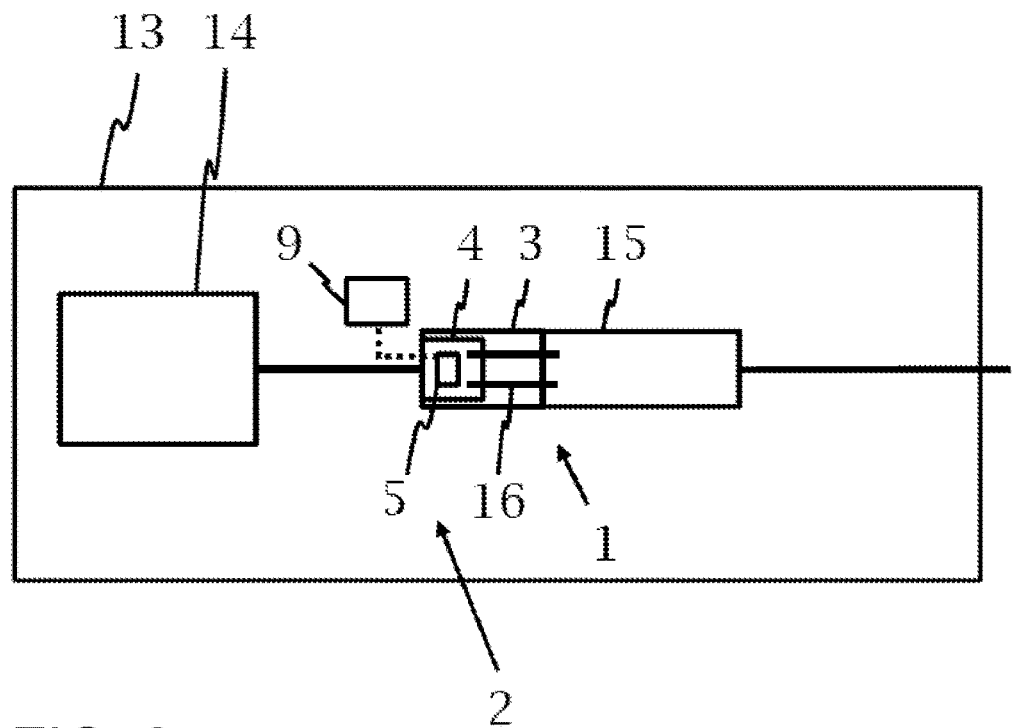
FIG. 1 is a block diagram of a motor vehicle having a device according to the invention.

Referring now to the figures of the drawings in detail and first, particularly, to FIG. 1 thereof, there is seen a block diagram of a motor vehicle 13 having an internal combustion engine 14, an exhaust system 2 connected to the internal combustion engine 14 and a device 1 according to the invention disposed in the exhaust system 2. The device 1 includes a first honeycomb body 4 which is disposed in a casing tube 3 and in which a current-conducting structure 5 is formed. The current-conducting structure 5 is connected to a control unit 9. In addition, a second honeycomb body 15 is disposed in the casing tube 3. The first honeycomb body 4 and the second honeycomb body 15, which is disposed at a distance behind the latter, are connected through support elements 16 which project into the honeycomb bodies 4, 15 and which are disposed in sleeves in the first honeycomb body 4, with the intermediate positioning of electrical insulation.

Figure 2:
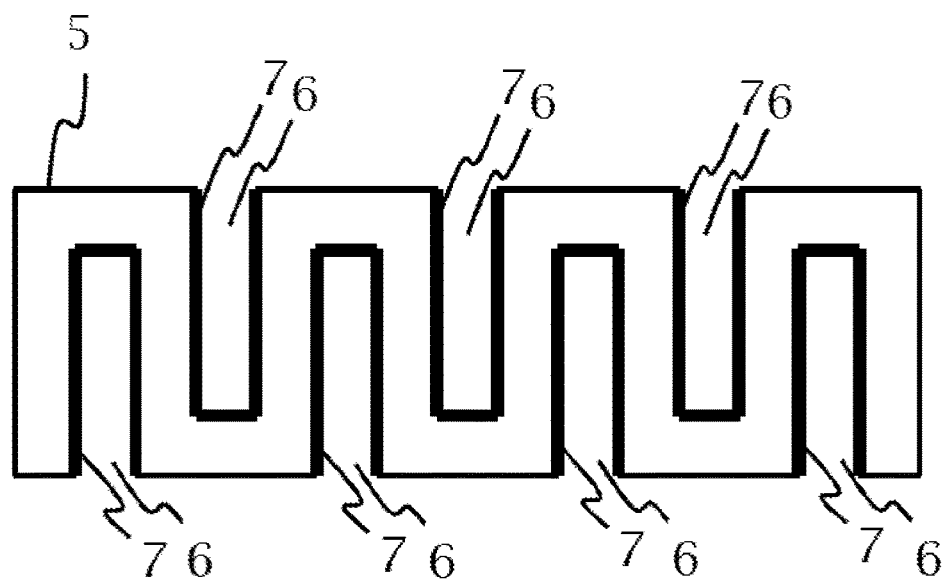
FIG. 2 is a diagrammatic, plan view of a current-conducting structure.

As is seen in FIG. 2, the current-conducting structure 5 is configured with gaps 6 and insulating material 7 in such a way that when a voltage of, for example, 48 V is applied, no arcing occurs during operation. In addition, during operation a pulsed voltage can be applied to the current-conducting structure 5 in such a way that the fed-in electrical energy can be matched to the current-conducting structure 5 and to the desired temperature of the exhaust gas.

FIG. 2 is a diagrammatic view of a portion of a current-conducting structure 5. The current-conducting structure 5 has a meandering shape. As a result, the gaps 6 are present in the current-conducting structure 5. In this exemplary embodiment, the insulating material 7 is applied to the current-conducting structure 5 as far as or up to the gaps 6. The gaps 6 and the insulating material 7 are configured in such a way that when a voltage of, for example, 48 V is applied, short-circuits, in particular due to arcing, cannot be formed.

Figure 3:
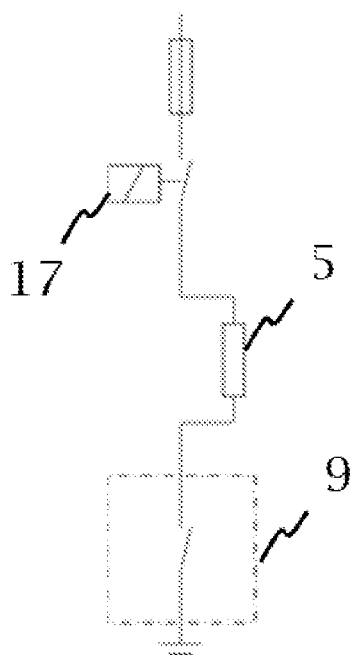
FIG. 3 is a schematic diagram of a first circuit for supplying voltage to a current-conducting structure.
Figure 4:
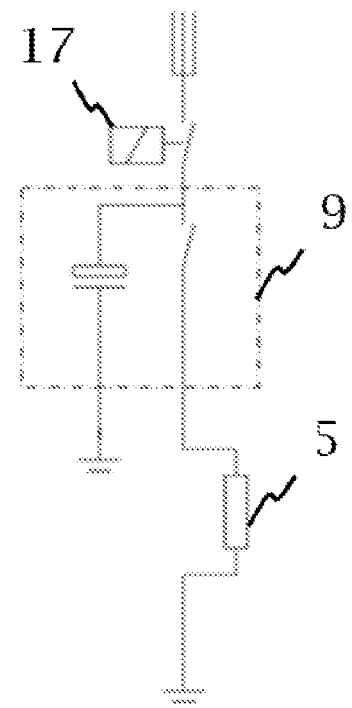
FIG. 4 is a schematic diagram of a second circuit for supplying voltage to a current-conducting structure.
Figure 5:
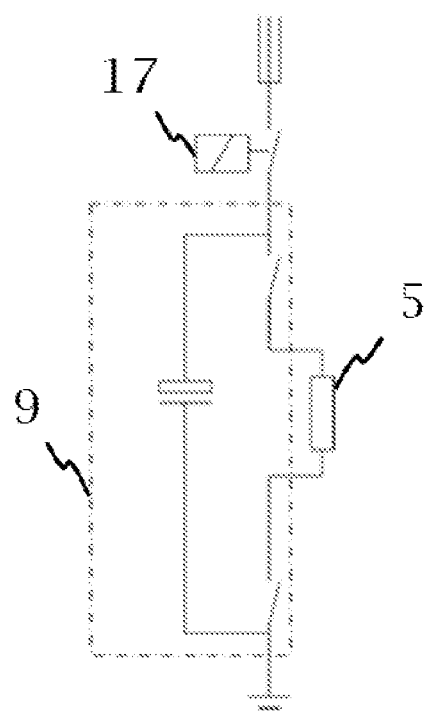
FIG. 5 is a schematic diagram of a third circuit for supplying voltage to a current-conducting structure.

FIGS. 3 to 5 are schematic diagrams of the electrical wiring of a current-conducting structure 5. The energy supply is generally provided by a battery of the motor vehicle 13. The circuits have a main switch 17 and the control unit 9. The main switch 17 mainly switches on the energy supply during the operation of the internal combustion engine 14, while an actuating device or actuator which is assigned to the control unit 9 serves during operation to influence the voltage applied to the current-conducting structure 5. It is therefore possible for a pulsed voltage to be generated by using the control unit 9, so that the pulsed voltage is present at the current-conducting structure 5.

In the wiring configuration illustrated in FIG. 3, the control unit 9 can influence the voltage supply between the current-conducting structure 5 and ground.

In the circuit diagram illustrated in FIG. 4, the control unit 9 can influence the voltage supply between the battery and the current-conducting structure 5.

In the circuit configuration illustrated in FIG. 5, the control unit 9 can vary the applied voltage both between the current-conducting structure 5 and the battery as well as between the current-conducting structure 5 and ground.

Figure 6:
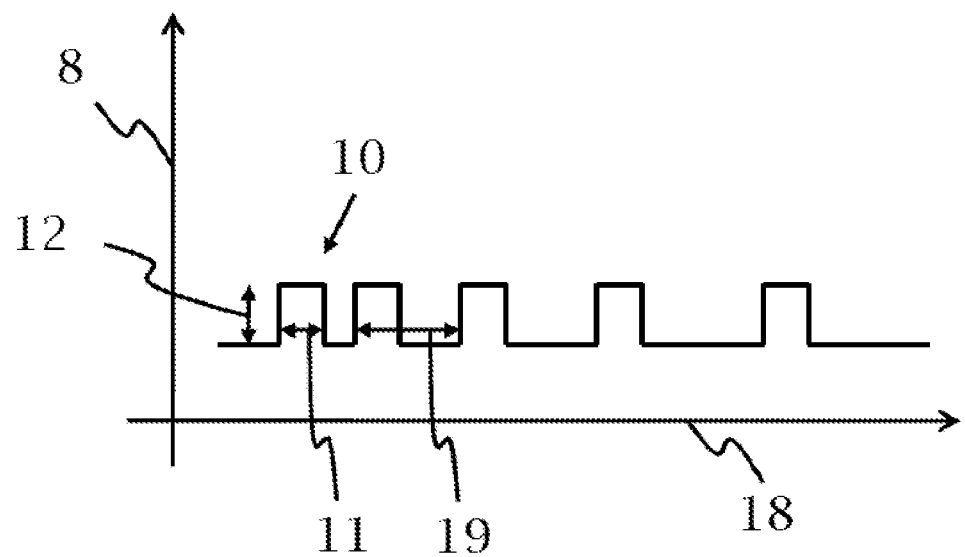
FIG. 6 is a diagram showing a voltage profile during frequency modulation.
Figure 7:
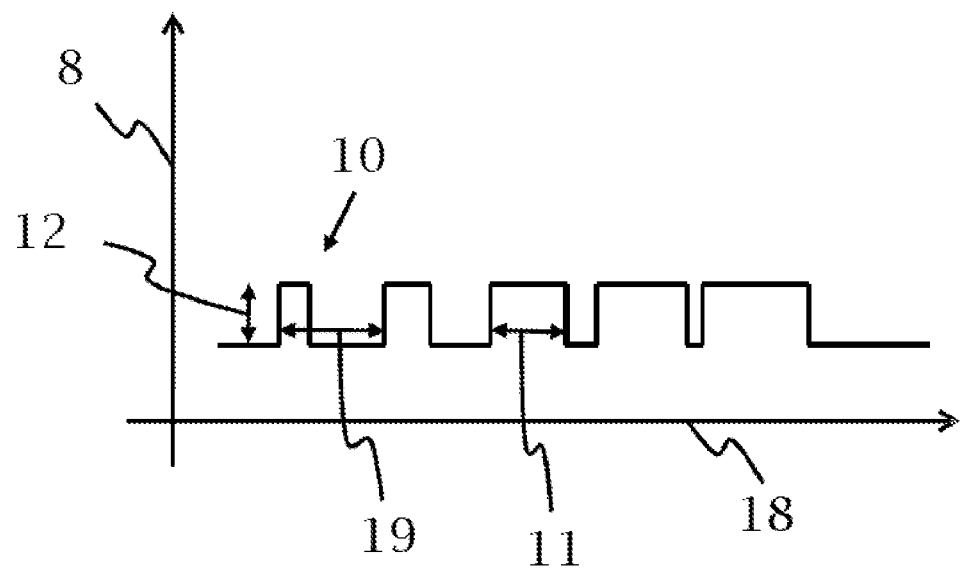
FIG. 7 is a diagram showing a voltage profile during pulse width modulation.

FIGS. 6 and 7 illustrate, by way of example, the setting possibilities of the energy which can be fed to a current-conducting structure 5, by using a pulsed voltage 8. For this purpose, the voltage 8 is plotted against time 18. Pulses 10, which are embodied as rectangular-wave pulses in this case, have a maximum voltage level 12 with a pulse length 11 and a pulse interval 19 with respect to one another. In FIG. 6, the principle of frequency modulation is illustrated. The pulses 10 are repeated with a constant pulse length 11 with different pulse intervals 19. In this way, by setting the repetition frequency, that is to say the reciprocal value of the pulse interval 19, it is possible to adjust the energy fed to the current-conducting structure 5 per time unit.

In contrast thereto, FIG. 7 shows a pulse width modulation. The pulses 10 are generated with a voltage level 12 and a pulse length 11 and with the same pulse interval 19, but the pulse length 11 is varied. As a result, the energy which is fed to the current-conducting structure 5 can be adjusted by using the pulse length. It is also possible for both the pulse length 11 and the pulse interval 19 to be varied.

With the teaching according to the invention it is possible to supply heating elements in an exhaust system with an on-board electrical system voltage of 48 V or even 60 V. In particular, a method is made available with which the use of heating elements having an electrical resistance which cannot be sufficiently increased becomes possible with a high operating voltage.

The invention claimed is:

1. A device for treating exhaust gases in an exhaust system, the device comprising:
   a casing tube; and
   a first honeycomb body through which an exhaust gas can flow;
   said first honeycomb body disposed in said casing tube;
   said first honeycomb body having at least one current-conducting structure bounded by at least one of gaps or insulating material providing insulation even under operating conditions for voltages higher than 24 V; and
   a control unit configured to generate pulsed voltages of at least 24 V, each of said pulsed voltages having a pulse length and a pulse interval with respect to one another, said control unit additionally configured to apply said pulsed voltages with a repetition rate to said current-conducting structure, said control unit further configured to vary at least one of the pulse length and the pulse interval of said pulsed voltages applied with a repetition rate to said current-conducting structure over time.

2. The device according to claim 1, wherein said at least one of gaps or insulating material providing insulation even under operating conditions for voltages higher than 48 V.

3. The device according to claim 1, wherein said control unit is configured to generate a pulsed voltage of between 48 and 60 V.

4. The device according to claim 1, wherein said at least one current-conducting structure has an electrical resistance between 0.001Ω and 10Ω (Ohms).

5. The device according to claim 1, wherein said at least one current-conducting structure has an electrical resistance between 0.03Ω and 0.8Ω (Ohms).

6. The device according to claim 1, wherein said at least one current-conducting structure has an electrical resistance between 0.05Ω and 0.3Ω (Ohms).

7. A method for operating an electrically heatable honeycomb body through which an exhaust gas can flow, the method comprising the following steps:
   providing a device for treating exhaust gases in an exhaust system according to claim 1;
   applying, with the control device, the pulsed voltages higher than 24 V with a repetition rate to the at least one current-conducting structure to heat the honeycomb body through which an exhaust gas can flow; and
   varying over time at least one of the pulse length and the pulse interval of said pulsed voltages applied with a repetition rate to said current-conducting structure.

8. The method according to claim 7, which further comprises applying the pulsed voltage with a repetition rate of 0.1 Hz to 1000 Hz (Hertz).

9. The method according to claim 7, which further comprises applying the pulsed voltage with a repetition rate of 1 Hz to 100 Hz (Hertz).

10. The method according to claim 7, which further comprises providing each pulse of the pulsed voltage with a pulse length of 0.005 s to 0.5 s (seconds).

11. The method according to claim 7, which further comprises providing the pulsed voltage with a maximum voltage level between 48 V and 60 V.

12. The method according to claim 7, which further comprises adjusting at least one of a pulse length or a repetition rate of the pulsed voltage as a function of exhaust gas parameters.

13. The method according to claim 12, wherein the exhaust gas parameters include a temperature of the exhaust gas.

* * * * *